2,793,162
Patented May 21, 1957

2,793,162

PRODUCTION OF 11β-HYDROXY-STEROIDS BY COLLETOTRICHUM

Richard W. Thoma, Somerville, John R. Gerke, Franklin Township, and Josef Fried, New Brunswick, N. J., assignors to Olin Mathieson Chemical Corporation, a corporation of Virginia No Drawing. Application July 31, 1953,
Serial No. 371,728

6 Claims. (Cl. 195—51)

This invention relates to a biosynthetic method for the preparation of 11β-hydroxy-steroids of the pregnane (including pregnene) series, especially for the preparation of hydrocortisone, involving microbiological oxidation of the corresponding 11-desoxy-steroid, especially 11-desoxy-17α-hydroxy-corticosterone (also known as $\Delta^4$-pregnene-17α,21-diol-3,20-dione and, as hereinafter referred to for brevity, as "Compound S").

More particularly, the method of this invention involves subjecting a 11-desoxy-steroid of the pregnane series, especially Compound S, to the action of an enzyme (or enzymes, or enzyme systems) of a microorganism selected from a particular group of organisms of the class Fungi Imperfecti in an aqueous medium in the presence of oxygen, and recovering the 11β-hydroxy-steroid (e. g., hydrocortisone) formed. The action of the enzyme can be utilized either by including the 11-desoxy-steroid in an aerated culture of the microorganism in or on a suitable nutrient medium, or by bringing together in an aqueous medium the 11-desoxy-steroid, oxygen, and the enzyme of non-proliferating cells of the microorganism, the first alternative being preferred.

The particular group of organisms utilizable for the purposes of this invention is the group constituted by the genera Colletotrichum, Tricothecium and Coniothyrium; preferably the species is of the group consisting of *Colletotrichum pisi*, *Colletotrichum phomoides*, *Tricothecium roseum* (also known as *Cephalothecium roseum*) and *Coniothyrium helleborine* (obtainable, inter alia, from the Department of Botany, Kansas State College and from the American Type Culture Collection under Catalog No. 12,522).

The 11-desoxy-steroids utilizable in the method of this invention include, inter alia, Compound S (yielding hydrocortisone), progesterone (yielding 11β-hydroxy-progesterone), desoxy-cortiscosterone (yielding corticosterone) and 17α-hydroxy-progesterone (yielding 11β, 17α-dihydroxy-progesterone).

A suitable nutrient medium essentially comprises a source of nitrogenous factors, and an assimilable source of carbon and energy. The latter may be a carbohydrate (such as sucrose, molasses, glucose, maltose, starch, or dextrin) and/or the 11-desoxy-steroid itself. Preferably, however, the medium includes an assimilable source of carbon and energy in addition to the 11-desoxy-steroid; and preferably also, this source is at least in substantial part a member of the group consisting of (1) fat acids having at least 14 carbon atoms and (2) fats. Use of such lipid source of carbon and energy (especially use of a fatty oil) is advantageous in that it regulates the availability of the 11-desoxy-steroid for conversion.

Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fat acids utilizable for the purpose of this invention are: stearic acid, palmitic acid, oleic acid, linoleic acid, and myristic acid.

The source of nitrogenous factors may be organic (e. g., soybean meal, corn steep liquor, meat extract, and/or distillers solubles) or synthetic (i. e., composed of simple, synthesizable organic and inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture.

The 11-desoxy-steroid may be added to the culture during the incubation period, or included in the medium prior to sterilization or inoculation. The preferred (but not limiting) range of concentration of the 11-desoxy-steroid in the culture is about 0.025 to 0.25%. The culture period (or rather the time of subjecting the 11-desoxy-steroid to the action of the enzyme) may vary considerably, the range of about 5 to 100 hours being feasible, but not limiting.

The 11β-hydroxy-steroid (e. g. hydrocortisone) formed may be detected and quantitatively measured without isolation by paper chromatography of a concentrated extract of the culture filtrate, and (in the cases of hydrocortisone and corticosterone) confirmed by rat glycogen deposition assay. The paper chromatography method, based on that of Zaffaroni and Burton [J. Biol. Chem., 193, 749–67 (1951)], involves careful standardization based on hydrocortisone (for example) moving at one-third the rate of Compound S in the benzene-water system, and on its moving at four times the rate of 11-epi-hydrocortisone in a benzene-ethanol-water system. Thus, 8.0 ml. of culture filtrate is equilibriated with 5.0 ml. methyl-isobutyl ketone (MIBK), 4.0 ml. of the MIBK phase is separated, evaporated to dryness, and redissolved in 0.20 ml. of a 1:1 mixture of chloroform and absolute ethanol. An amount of this chloroform-ethanol solution containing 10–100γ hydrocortisone is applied to the paper strip, and the developed chromatogram is charted with the aid of an ultraviolet scanning device [Haines and Drake, Fed. Proc., 9, 180 (1950)]. The hydrocortisone zone is then cut out, eluted with 10 ml. 95% ethanol, and the ultraviolet absorption at 240 m$\mu$ is determined. Quantitative estimates are then made by reference to a standard curve prepared by adding several levels of hydrocortisone to 8.0 ml. aliquots of unfermented nutrient medium, and carrying out the extraction.

The 11β-hydroxy-steroid may be recovered from the culture in which it is formed by separating the culture solids, extracting the culture liquid with a chlorinated hydrocarbon solvent, removing material insoluble in the extract, separating the solvent from the extract, and acylating (preferably acetylating) the residue. Utilizable chlorinated hydrocarbon solvents include chloroform, ethylene dichloride, and trichlorethylene.

A valuable by-product of the biosynthesis of hydrocortisone in accordance with this invention is 11-epi-F diacetate (11-epi-17α-hydroxycorticosterone diacetate) which is chromatographically separable from the hydrocortisone acetate formed and isolatable in pure form. This by-product is useful for the preparation of physiologically active steroids.

The following examples are illustrative of the invention:

Example 1

(a) *Fermentation.*—A fermentation medium (A) of the following composition is prepared:

| | Grams |
|---|---|
| Cornsteep liquor solids | 3.0 |
| (NH$_4$)H$_2$PO$_4$ | 3.0 |
| CaCO$_3$ | 2.5 |
| Soybean oil | 2.2 |
| Yeast extract | 2.5 |
| Glucose | 10 |

Distilled water to make one liter.

[The same medium may be employed for germination of the inoculating microorganism.] The pH of the medium is adjusted to 7.0±0.1 with 2 normal NaOH solution; 0.5 g. Compound S is added; 100 ml. portions of the medium are distributed in 500 ml. Erlenmeyer flasks, and the flasks are plugged with cotton and sterilized by autoclaving for 30 minutes at 120° C.; and when cool, each of the flasks is inoculated with 5–10% of a vegetative inoculum of *T. roseum*. [A stock culture of the microorganism is obtainable from the Department of Plant Pathology, Cornell University, Ithaca, New York, and the American Type Culture Collection under Catalog No. 12,519; and the inoculum is obtained by growing the microorganism in a medium of the same composition for 48 hours.] The flasks are then mechanically shaken for 72 hours in a room maintained at 25° C., following which the contents of the flasks are pooled, adjusted to pH 4.0±0.2, with 12 N sulfuric acid, and filtered by suction through Seitz filter pads to remove the mycelium.

(b) *Isolation of the hydrocortisone formed.*—A quantity of culture filtrate obtained as described in *a* by fermentation of 2.0 g. Compound S is extracted with twice its volume of chloroform, and the chloroform extract is filtered and evaporated to dryness in vacuo. The residue (total steroid fraction, weighing about 1.166 g.), is triturated with chloroform, leaving behind a crystalline residue weighing about 256 mg. and melting at about 197–200° C. 244 mg. of this crystalline residue is acetylated with 1 ml. acetic anhydride in 2 ml. pyridine for 16 hours at room temperature, and the acetylating reagents are removed in high vacuum. The residue (weighing about 268 mg.) is dissolved in 1 ml. chloroform and 9 ml. benzene, and the solution is chromatographed on 5 g. silica gel. Elution with chloroform in benzene (1:1) yields first a lower melting fraction (185–192° C.; about 28 mg. in 75 ml.), followed by essentially pure 11-epi-F diacetate (about 97 mg. in about 500 ml.). After a recrystallization from acetone-hexane, the latter melts at 223–225° C., shows no depression of melting point when mixed with an authentic sample of 11-epi-F diacetate, and has an infrared spectrum identical with that of the sample. Further elution of the column with chloroform yields an additional amount of 11-epi-F diacetate (about 37 mg. in about 100 ml.), followed by a mixed fraction in the next 200 mls. of chloroform. Final elution with chloroform (about 500 ml.) and evaporation of the chloroform yields about 17 mg. crystalline material, differing from the 11-epi-F diacetate by its low solubility in chloroform. Recrystallization of this finally eluted material from acetone yields pure hydrocortisone acetate, having the following properties: M. P. 216–219° C.; $[\alpha]_D$+156° (c., 0.32 in chloroform);

$$\lambda_{max}^{alc.} \ 241 \ m\mu \ (\epsilon = 16,700)$$

infrared spectrum identical with that of authentic sample of hydrocortisone acetate.

Hydrocortisone may be produced from its acetate thus obtained by conventional means, e. g. hydrolysis with dilute sodium bicarbonate solution; and if desired, the hydrocortisone may be converted into esters of other acids.

Example 2

The same fermentation conditions as described in section *a* of Example 1 are employed, except that the Compound S is added to the 48-hour old culture (inoculated from spores) in a concentration of 25 mg. per 100 ml. medium; and the culture is harvested 48 hours thereafter.

Example 3

The procedure of Example 1 (a) is modified in the respects following. The inoculum is prepared by growing the microorganism for 48 hours in a germination medium (B) of the following composition, adjusted to pH 7.0±0.1: corn steep liquor solids, 15 g.; brown sugar, 10 g.; NaNO$_3$, 6 g.; ZnSO$_4$ .001 g.; KH$_2$PO$_4$, 1.5 g.; MgSO$_4$.7H$_2$O, 0.5 g.; calcium carbonate, 5 g.; lard oil, 2 g. and distilled water to make 1 liter. This inoculum is used to inoculate 600 ml. of fermentation medium A described in Example 1 (a) to which has been added 300 mg. Compound S.

Example 4

The same fermentation conditions as described in section *a*, Example 1 are employed, except that a 24-hour culture of the microorganism in germination medium B, derived from a 48-hour culture in germination medium B, derived from spores, is used to inoculate 600 ml. of fermentation medium A containing 300 ml. Compound S; and the culture is harvested at 66 hours.

Example 5

The same fermentation conditions as described in section *a*, Example 1 are employed, except that a 24-hour culture of the microorganism in fermentation medium A, derived from a 48-hour culture in germination medium B, derived from spores, is used to inoculate 4 liters of fermentation medium A containing 2.0 g. Compound S and the culture is harvested at 67 hours.

Examples 6–7

The same fermentation conditions as described in section *a*, Example 1 are employed, except that the microorganism employed is either *C. phomoides* (obtainable, inter alia, from the American Type Culture Collection under Catalogue No. 12,521) or *C. pisis* (obtainable, inter alia, from the American Type Culture Collection under Catalogue No. 12,520), and the Compound S is added to the 72-hour culture, and the culture harvested 48 hours thereafter.

Example 8

The same fermentation conditions as described in section *a*, Example 1 are employed, except that the organism used is *C. helleborine*.

Examples 9, 10, 11

The same fermentation conditions as described in section *a*, Example 1 are employed, except that the microorganism is *C. phomoides*, *C. pisi*, or *C. helleborine*, the inoculum is a 48-hour culture of the microorganism in fermentation medium A, the fermentation medium contains 300 mg. Compound S per 600 ml., and the culture is harvested at 67 hours.

Example 12

The same fermentation conditions as described in section *a*, Example 1 are employed, except that the Compound S is added to the 24-hour culture, 100 mg. of this compound in 3.0 ml. of methanol being added to each 100 ml. culture. A 10% conversion of the compound to hydrocortisone is obtained after 24 hours incubation of the medium.

Examples 13, 14, 15

The same fermentation conditions as described in Example 12 are employed, except that the organism employed is either *Colletotrichum phomoides, Colletotrichum pisi,* or *Coniothyrium helleborine.*

The hydrocortisone formed in each of Examples 2 to 15, inclusive, is recoverable from the culture filtrate (obtained as described in section *a* of Example 1) following the procedure described in section *b* of that example. When employing *Colletotrichum pisi* or *Coniothyrium helleborine* as the organism, the total steroid fraction may be acetylated without pre-fractionation, and the hydrocortisone isolated from the reaction mixture as further described in section *b,* Example 1.

*Example 16*

*Coniothyrium helleborine* is grown in fermentation medium A (inoculation being with a 48-hour growth in the same medium, originating with spores) for 48 hours; then desoxy-corticosterone (in methanol) is added to give a 0.025% desoxy-corticosterone concentration (and 1% methanol concentration) in the medium; and after 24 hours incubation, the culture is harvested, and the culture filtrate treated (e. g. by chloroform extraction and chromatographic fractionation) to recover the corticosterone (and 11-epi-corticosterone) formed.

Under the same conditions, *Colletotrichum pisi, Colletotrichum phomoides,* or *Tricothecium roseum* converts desoxycorticosterone into corticosterone.

Other media than those described in the foregoing examples may be used for the purpose of the invention, the only requirement being that it supports growth of the particular organism in the presence of oxygen. The incubation time may be varied over a wide range, the incubation, of course, being stopped when the medium contains the maximum titer of 11β-hydroxy-steroid, which is readily determinable for each set of conditions.

Where the 11-desoxy-steroid is included in the fermentation medium before inoculation, it is preferable to dissolve it in chloroform for ease of handling (e. g. 1 ml. chloroform containing 50 mg. of Compound S per 100 ml. medium), the chloroform being removed from the medium during sterilization (i. e. before inoculation). The 11-desoxy-steroid may be converted into the corresponding 11β-hydroxy-steroid by bringing together the compound and oxygen in an aqueous suspension of nonproliferating cells of the microorganism, or by bringing together the compound, oxygen, and enzymes of the microorganism in an aqueous cell-free medium. Thus a 3-day culture of *T. roseum* grown on the same fermentation medium as used in Example 1 but without inclusion of Compound S is centrifuged, resuspended in distilled water, recentrifuged and again resuspended in distilled water; the suspension is placed in a flask; Compound S is added; the flask is agitated at 25° C. for 24 hours; the suspension is filtered; and the hydrocortisone formed is recovered by chloroform extraction of the filtrate and further treatment as described in section *b* of Example 1.

Other expedients conventional in microbiological oxidation may be employed in the practice of this invention. Thus, the microorganism may be grown on a medium best adapted for its propagation; the mycelium separated from the culture liquid after substantial propagation; and the mycelium resuspended in a new fermentation medium containing 11-desoxy-steroid. Also the mycelium may be used repeatedly, i. e., the culture liquid containing the 11β-hydroxy-steroid separated from the mycelium, the former treated for recovery of the 11β-hydroxy-steroid, and the latter resuspended in a new batch of fermentation medium containing the 11-desoxy-steroid.

The invention may be variously otherwise embodied within the scope of the appended claims.

We claim:

1. The method of producing a 11β-hydroxy-steroid of the pregnane series, which comprises subjecting the corresponding 11-desoxy-steroid to the action of an enzyme of a microorganism in an aqueous medium in the presence of oxygen, the microorganism being selected from the group consisting of *Colletotrichum pisi* and *Colletotrichum phomoides,* and recovering the 11β-hydroxy-steroid formed.

2. The method of producing hydrocortisone, which comprises subjecting Compound S to the action of an enzyme of a microorganism in an aqueous medium in the presence of oxygen, the microorganism being selected from the group consisting of *Colletotrichum pisi* and *Colletotrichum phomoides,* and recovering the hydrocortisone formed.

3. The method of producing hydrocortisone, which comprises cultivating a microorganism under aerobic conditions in an aqueous nutrient medium containing Compound S, the microorganism being selected from the group consisting of *Colletotrichum pisi* and *Colletotrichum phomoides,* allowing the fermentation to proceed until a substantial amount of hydrocortisone is formed, and recovering the hydrocortisone.

4. The method defined by claim 1, in which the microorganism is *C. pisi.*

5. The method defined by claim 1, in which the microorganism is *C. phomoides.*

6. The method defined by claim 2, in which the Compound S is included in the medium in a concentration between about 0.025% and about 0.25%.

References Cited in the file of this patent

UNITED STATES PATENTS

| | | |
|---|---|---|
| 2,602,769 | Murray | July 8, 1952 |
| 2,649,400 | Murray et al. | Aug. 18, 1953 |
| 2,649,401 | Haines | Aug. 18, 1953 |
| 2,649,402 | Murray et al. | Aug. 18, 1953 |
| 2,658,023 | Shull | Nov. 3, 1953 |
| 2,765,258 | Shull et al. | Oct. 2, 1956 |